United States Patent
Gomadam et al.

(10) Patent No.: US 9,143,951 B2
(45) Date of Patent: Sep. 22, 2015

(54) METHOD AND SYSTEM FOR COORDINATED MULTIPOINT (COMP) COMMUNICATION BETWEEN BASE-STATIONS AND MOBILE COMMUNICATION TERMINALS

(71) Applicant: Marvell World Trade Ltd., St. Michael (BB)

(72) Inventors: Krishna Srikanth Gomadam, San Jose, CA (US); Jihwan P. Choi, Daegu (KR)

(73) Assignee: MARVELL WORLD TRADE LTD., St. Michael (BB)

( * ) Notice: Subject to any disclaimer, the term of this patent is extended or adjusted under 35 U.S.C. 154(b) by 207 days.

(21) Appl. No.: 13/862,422

(22) Filed: Apr. 14, 2013

(65) Prior Publication Data

US 2013/0288730 A1    Oct. 31, 2013

Related U.S. Application Data

(60) Provisional application No. 61/639,779, filed on Apr. 27, 2012.

(51) Int. Cl.
| | |
|---|---|
| *H04B 7/00* | (2006.01) |
| *H04W 24/00* | (2009.01) |
| *H04B 7/02* | (2006.01) |
| *H04B 7/06* | (2006.01) |
| *H04W 72/04* | (2009.01) |

(Continued)

(52) U.S. Cl.
CPC ............... *H04W 24/00* (2013.01); *H04B 7/024* (2013.01); *H04B 7/0619* (2013.01); *H04B 17/24* (2015.01); *H04B 17/309* (2015.01); *H04L 25/0224* (2013.01); *H04W 72/042* (2013.01)

(58) Field of Classification Search
USPC .............. 455/509, 522, 69, 63.1, 269, 456.6, 455/561, 512, 435.1; 370/318, 335, 342, 370/351, 252, 329, 328, 330, 316
See application file for complete search history.

(56) References Cited

U.S. PATENT DOCUMENTS

| | | |
|---|---|---|
| 5,231,629 A | 7/1993 | Kotzin et al. |
| 5,263,160 A | 11/1993 | Porter, Jr. et al. |

(Continued)

FOREIGN PATENT DOCUMENTS

| | | |
|---|---|---|
| EP | 2182754 A1 | 5/2010 |
| JP | 2008236222 A | 2/2008 |

(Continued)

OTHER PUBLICATIONS

U.S. Appl. No. 13/543,835 Office Action dated Nov. 22, 2013.

(Continued)

*Primary Examiner* — Ganiyu A Hanidu

(57) ABSTRACT

A method includes receiving, at a communication terminal, signals from a group of cells that cooperate in a Coordinated Multipoint (CoMP) transmission scheme. Signaling that specifies a CoMP resource management (CRM) set is received at the communication terminal. The CRM set includes a subset of the cells in the group for which the communication terminal is to perform signal measurements. A size of the CRM set is restricted to a predefined maximum size. The signal measurements are performed at the communication terminal only on the signals received from one or more of the cells in the CRM set. The signal measurements performed on the one or more of the cells in the CRM set are reported from the communication terminal.

18 Claims, 2 Drawing Sheets

(51) Int. Cl.
   *H04L 25/02* (2006.01)
   *H04B 17/24* (2015.01)
   *H04B 17/309* (2015.01)

(56) References Cited

U.S. PATENT DOCUMENTS

| | | |
|---|---|---|
| 5,349,567 A | 9/1994 | Reed |
| 5,940,439 A | 8/1999 | Kleider et al. |
| 6,466,904 B1 | 10/2002 | Gao et al. |
| 6,512,750 B1 | 1/2003 | Palenius |
| 6,757,319 B1 | 6/2004 | Parsa et al. |
| 6,865,237 B1 | 3/2005 | Boariu et al. |
| 7,839,944 B2 | 11/2010 | Lee et al. |
| 7,941,186 B2 | 5/2011 | Cho et al. |
| 8,036,286 B2 | 10/2011 | Lee et al. |
| 8,068,555 B2 | 11/2011 | Jongren et al. |
| 8,098,750 B2 | 1/2012 | Mueck et al. |
| 8,179,775 B2 | 5/2012 | Chen et al. |
| 8,325,844 B2 | 12/2012 | Walton et al. |
| 8,515,435 B2 | 8/2013 | Krasny et al. |
| 8,559,879 B2 | 10/2013 | Bhushan et al. |
| 8,565,808 B2 * | 10/2013 | Hosono et al. ............... 455/522 |
| 8,694,017 B2 | 4/2014 | Bhushan |
| 2002/0001333 A1 | 1/2002 | Glasheen et al. |
| 2003/0035491 A1 | 2/2003 | Walton et al. |
| 2005/0108281 A1 | 5/2005 | Kim et al. |
| 2005/0141630 A1 | 6/2005 | Catreux et al. |
| 2005/0157810 A1 | 7/2005 | Raleigh et al. |
| 2005/0237920 A1 | 10/2005 | Howard et al. |
| 2005/0250544 A1 | 11/2005 | Grant et al. |
| 2005/0276317 A1 | 12/2005 | Jeong et al. |
| 2006/0014554 A1 | 1/2006 | Gerlach |
| 2006/0056538 A1 | 3/2006 | Nam et al. |
| 2006/0093060 A1 | 5/2006 | Jung et al. |
| 2006/0114858 A1 | 6/2006 | Walton et al. |
| 2006/0153112 A1 | 7/2006 | Lim et al. |
| 2006/0203777 A1 | 9/2006 | Kim et al. |
| 2006/0233131 A1 | 10/2006 | Gore et al. |
| 2006/0276212 A1 | 12/2006 | Sampath et al. |
| 2007/0058746 A1 | 3/2007 | Gueguen |
| 2007/0076810 A1 | 4/2007 | Herrera et al. |
| 2007/0099578 A1 | 5/2007 | Adeney et al. |
| 2007/0149229 A1 | 6/2007 | Frederiksen et al. |
| 2007/0153731 A1 | 7/2007 | Fine |
| 2007/0160162 A1 | 7/2007 | Kim et al. |
| 2007/0165738 A1 | 7/2007 | Barriac et al. |
| 2007/0201407 A1 | 8/2007 | Borran et al. |
| 2007/0217540 A1 | 9/2007 | Onggosanusi et al. |
| 2007/0223422 A1 | 9/2007 | Kim et al. |
| 2007/0223423 A1 | 9/2007 | Kim et al. |
| 2007/0230373 A1 | 10/2007 | Li et al. |
| 2007/0248068 A1 | 10/2007 | Onggosanusi et al. |
| 2007/0253386 A1 | 11/2007 | Li et al. |
| 2007/0270170 A1 | 11/2007 | Yoon et al. |
| 2008/0013610 A1 | 1/2008 | Varadarajan et al. |
| 2008/0025336 A1 | 1/2008 | Cho et al. |
| 2008/0039067 A1 | 2/2008 | Jin et al. |
| 2008/0043702 A1 | 2/2008 | Moon et al. |
| 2008/0049709 A1 | 2/2008 | Pan et al. |
| 2008/0080364 A1 | 4/2008 | Barak et al. |
| 2008/0080632 A1 | 4/2008 | Kim et al. |
| 2008/0080634 A1 | 4/2008 | Kotecha et al. |
| 2008/0080635 A1 | 4/2008 | Hugl et al. |
| 2008/0080637 A1 | 4/2008 | Khan et al. |
| 2008/0095258 A1 | 4/2008 | She et al. |
| 2008/0101407 A1 | 5/2008 | Khan et al. |
| 2008/0108310 A1 | 5/2008 | Tong et al. |
| 2008/0112351 A1 | 5/2008 | Surineni et al. |
| 2008/0130778 A1 | 6/2008 | Xia et al. |
| 2008/0144522 A1 | 6/2008 | Chang et al. |
| 2008/0165875 A1 | 7/2008 | Mundarath et al. |
| 2008/0186212 A1 | 8/2008 | Clerckx et al. |
| 2008/0192852 A1 | 8/2008 | Kent et al. |
| 2008/0198776 A1 | 8/2008 | Seo |
| 2008/0232494 A1 | 9/2008 | Pan et al. |
| 2008/0232503 A1 | 9/2008 | Kim |
| 2008/0247364 A1 | 10/2008 | Kim et al. |
| 2008/0247475 A1 | 10/2008 | Kim et al. |
| 2008/0268855 A1 | 10/2008 | Hanuni et al. |
| 2008/0268887 A1 | 10/2008 | Jansen et al. |
| 2008/0285433 A1 | 11/2008 | Akita et al. |
| 2008/0292013 A1 | 11/2008 | Varadarajan et al. |
| 2008/0298452 A1 | 12/2008 | Sampath et al. |
| 2008/0298482 A1 | 12/2008 | Rensburg et al. |
| 2008/0318606 A1 | 12/2008 | Tsutsui et al. |
| 2009/0011761 A1 | 1/2009 | Han et al. |
| 2009/0016263 A1 | 1/2009 | Kishigami et al. |
| 2009/0046800 A1 | 2/2009 | Xu et al. |
| 2009/0098876 A1 | 4/2009 | Khan et al. |
| 2009/0110114 A1 | 4/2009 | Onggosanusi et al. |
| 2009/0122857 A1 | 5/2009 | Li et al. |
| 2009/0161605 A1 | 6/2009 | Shen et al. |
| 2009/0180561 A1 | 7/2009 | Kim et al. |
| 2009/0245195 A1 | 10/2009 | Bhattad et al. |
| 2009/0247084 A1 | 10/2009 | Palanki |
| 2009/0252332 A1 | 10/2009 | Chang et al. |
| 2009/0252333 A1 | 10/2009 | Chang et al. |
| 2009/0282310 A1 | 11/2009 | Seok et al. |
| 2009/0296844 A1 | 12/2009 | Ihm et al. |
| 2009/0304109 A1 | 12/2009 | Kotecha |
| 2010/0009634 A1 | 1/2010 | Budianu et al. |
| 2010/0019631 A1 | 1/2010 | Olson |
| 2010/0020852 A1 * | 1/2010 | Erell et al. ............... 375/141 |
| 2010/0031117 A1 | 2/2010 | Lee et al. |
| 2010/0034308 A1 | 2/2010 | Kim et al. |
| 2010/0035627 A1 | 2/2010 | Hou et al. |
| 2010/0054354 A1 | 3/2010 | Tosato |
| 2010/0056170 A1 | 3/2010 | Lindoff et al. |
| 2010/0061477 A1 | 3/2010 | Lee et al. |
| 2010/0067512 A1 | 3/2010 | Nam et al. |
| 2010/0069106 A1 | 3/2010 | Swarts et al. |
| 2010/0074301 A1 | 3/2010 | Howard et al. |
| 2010/0103834 A1 | 4/2010 | Gorokhov et al. |
| 2010/0113078 A1 | 5/2010 | Farajidana et al. |
| 2010/0158151 A1 | 6/2010 | Krauss et al. |
| 2010/0172424 A1 | 7/2010 | Perets et al. |
| 2010/0172430 A1 | 7/2010 | Melzer et al. |
| 2010/0173639 A1 | 7/2010 | Li et al. |
| 2010/0215112 A1 | 8/2010 | Tsai et al. |
| 2010/0220800 A1 | 9/2010 | Erell et al. |
| 2010/0238984 A1 | 9/2010 | Sayana et al. |
| 2010/0254474 A1 | 10/2010 | Gomadam et al. |
| 2010/0260234 A1 | 10/2010 | Thomas et al. |
| 2010/0260243 A1 | 10/2010 | Ihm et al. |
| 2010/0267341 A1 | 10/2010 | Bergel et al. |
| 2010/0271968 A1 * | 10/2010 | Liu et al. ............... 370/252 |
| 2010/0272014 A1 | 10/2010 | Orlik et al. |
| 2010/0272032 A1 | 10/2010 | Sayana et al. |
| 2010/0273495 A1 | 10/2010 | Onggosanusi et al. |
| 2010/0273514 A1 | 10/2010 | Koo et al. |
| 2010/0278278 A1 | 11/2010 | Lee et al. |
| 2010/0284484 A1 | 11/2010 | Jongren et al. |
| 2010/0290548 A1 | 11/2010 | Hoshino et al. |
| 2010/0296603 A1 | 11/2010 | Lee et al. |
| 2010/0309861 A1 | 12/2010 | Gorokhov et al. |
| 2011/0013710 A1 | 1/2011 | Xiao |
| 2011/0026413 A1 | 2/2011 | Swarts et al. |
| 2011/0034175 A1 | 2/2011 | Fong et al. |
| 2011/0034192 A1 | 2/2011 | Lim et al. |
| 2011/0044193 A1 | 2/2011 | Forenza et al. |
| 2011/0058621 A1 | 3/2011 | Clerckx et al. |
| 2011/0064156 A1 | 3/2011 | Kim et al. |
| 2011/0077038 A1 | 3/2011 | Montojo et al. |
| 2011/0080969 A1 | 4/2011 | Jongren et al. |
| 2011/0085610 A1 | 4/2011 | Zhuang et al. |
| 2011/0086663 A1 | 4/2011 | Gorokhov et al. |
| 2011/0096704 A1 | 4/2011 | Erell et al. |
| 2011/0103534 A1 | 5/2011 | Axmon et al. |
| 2011/0110403 A1 | 5/2011 | Jongren |
| 2011/0110450 A1 | 5/2011 | Gomadam et al. |
| 2011/0134774 A1 | 6/2011 | Pelletier et al. |
| 2011/0150052 A1 | 6/2011 | Erell et al. |
| 2011/0158190 A1 | 6/2011 | Kuwahara et al. |
| 2011/0164701 A1 | 7/2011 | Nikopourdeilami et al. |

(56) References Cited

U.S. PATENT DOCUMENTS

| | | |
|---|---|---|
| 2011/0170435 A1 | 7/2011 | Kim et al. |
| 2011/0170638 A1 | 7/2011 | Yuan et al. |
| 2011/0176439 A1 | 7/2011 | Mondal et al. |
| 2011/0188393 A1 | 8/2011 | Mallik et al. |
| 2011/0194594 A1 | 8/2011 | Noh et al. |
| 2011/0194638 A1 | 8/2011 | Erell et al. |
| 2011/0194644 A1 | 8/2011 | Liu et al. |
| 2011/0199986 A1* | 8/2011 | Fong et al. .................. 370/329 |
| 2011/0205930 A1 | 8/2011 | Rahman et al. |
| 2011/0216846 A1 | 9/2011 | Lee et al. |
| 2011/0235608 A1 | 9/2011 | Koo et al. |
| 2011/0250919 A1 | 10/2011 | Barbieri et al. |
| 2011/0261775 A1 | 10/2011 | Kim et al. |
| 2011/0268204 A1 | 11/2011 | Choi et al. |
| 2011/0274188 A1 | 11/2011 | Sayana et al. |
| 2011/0306341 A1 | 12/2011 | Klein et al. |
| 2012/0002568 A1 | 1/2012 | Tiirola et al. |
| 2012/0002743 A1 | 1/2012 | Cavalcante et al. |
| 2012/0003926 A1 | 1/2012 | Coldrey et al. |
| 2012/0008556 A1 | 1/2012 | Noh et al. |
| 2012/0020433 A1 | 1/2012 | Bhattad et al. |
| 2012/0028628 A1 | 2/2012 | Frenger et al. |
| 2012/0033592 A1 | 2/2012 | Kim et al. |
| 2012/0033630 A1 | 2/2012 | Chung et al. |
| 2012/0034927 A1 | 2/2012 | Papasakellariou et al. |
| 2012/0039369 A1 | 2/2012 | Choi et al. |
| 2012/0058735 A1 | 3/2012 | Vermani et al. |
| 2012/0063336 A1 | 3/2012 | Shany et al. |
| 2012/0069887 A1 | 3/2012 | Park et al. |
| 2012/0069917 A1 | 3/2012 | Liu et al. |
| 2012/0076028 A1 | 3/2012 | Ko et al. |
| 2012/0076038 A1 | 3/2012 | Shan et al. |
| 2012/0087425 A1 | 4/2012 | Gomadam et al. |
| 2012/0087435 A1 | 4/2012 | Gomadam et al. |
| 2012/0134434 A1 | 5/2012 | Chen et al. |
| 2012/0188976 A1 | 7/2012 | Kim et al. |
| 2012/0213261 A1 | 8/2012 | Sayana et al. |
| 2012/0219042 A1 | 8/2012 | Onggosanusi et al. |
| 2012/0219083 A1 | 8/2012 | Tong et al. |
| 2012/0250550 A1 | 10/2012 | Gomadam et al. |
| 2012/0257664 A1 | 10/2012 | Yue et al. |
| 2012/0275376 A1 | 11/2012 | Sampath et al. |
| 2012/0275386 A1 | 11/2012 | Frenne et al. |
| 2012/0281620 A1 | 11/2012 | Sampath et al. |
| 2012/0287799 A1 | 11/2012 | Chen et al. |
| 2012/0329502 A1 | 12/2012 | Frederiksen et al. |
| 2013/0028068 A1 | 1/2013 | Park et al. |
| 2013/0028344 A1 | 1/2013 | Chen et al. |
| 2013/0039284 A1 | 2/2013 | Marinier et al. |
| 2013/0051256 A1 | 2/2013 | Ong et al. |
| 2013/0077595 A1 | 3/2013 | Aiba et al. |
| 2013/0083681 A1 | 4/2013 | Ebrahimi Tazeh Mahalleh et al. |
| 2013/0088978 A1 | 4/2013 | Mondal et al. |
| 2013/0107916 A1 | 5/2013 | Liu et al. |
| 2013/0114427 A1 | 5/2013 | Maattanen et al. |
| 2013/0114428 A1 | 5/2013 | Koivisto et al. |
| 2013/0114431 A1 | 5/2013 | Koivisto |
| 2013/0114654 A1 | 5/2013 | Gomadam |
| 2013/0114655 A1 | 5/2013 | Gomadam |
| 2013/0122953 A1 | 5/2013 | Zhang et al. |
| 2013/0128847 A1 | 5/2013 | Wang et al. |
| 2013/0176991 A1 | 7/2013 | Yi |
| 2013/0182786 A1 | 7/2013 | Frenne et al. |
| 2013/0250885 A1 | 9/2013 | Davydov et al. |
| 2013/0272221 A1 | 10/2013 | Hoehne et al. |
| 2014/0029568 A1 | 1/2014 | Wang et al. |
| 2014/0029586 A1 | 1/2014 | Loehr et al. |
| 2014/0051357 A1 | 2/2014 | Steer et al. |

FOREIGN PATENT DOCUMENTS

| | | |
|---|---|---|
| JP | 2008054125 A | 3/2008 |
| JP | 2008118411 A | 5/2008 |
| JP | 2008147792 A | 6/2008 |
| WO | 2005117283 A2 | 12/2005 |
| WO | 2007133564 A3 | 11/2007 |
| WO | 2008009157 A1 | 1/2008 |
| WO | 2008133582 A2 | 11/2008 |
| WO | 2009116471 A1 | 9/2009 |
| WO | 2010013950 A2 | 2/2010 |
| WO | 2011147692 A1 | 12/2011 |

OTHER PUBLICATIONS

3rd Generation Partnership Project; Technical Specification Group Radio Access Network; Requirements for Further Advancements for Evolved Universal Terrestrial Radio Access (E-UTRA) (LTE-Advanced) (Release 8), 3GPP TR 36.913 V8.0.1, Sophia Antipolis, France, Mar. 2009.

Motorola, "Uplink Power Control for E-UTRA", 3GPP TSG RAN1 #48, St. Louis, USA, Feb. 12-16, 2007.

Nortel, "On the discussions of carrier aggregations", 3GPP TSG-RAN Working Group 1 Meeting #55, Prague, Czech Republic, Nov. 10-14, 2008.

NTT Docomo, Inc., "Updated Views on Support of Wider Bandwidth in LTE-Advanced", 3GPP TSG RAN WG1 Meeting #54bis, Prague, Czech Republic, Sep. 29-Oct. 3, 2008.

3rd Generation Partnership Project; Technical Specification Group Radio Access Network; User Equipment (UE) radio transmission and reception (FDD) (Release 8), 3GPP TS 25.101 V8.5.1, Sophia Antipolis, France, Jan. 2009.

Lucent Technologies, "Link Error Prediction for E-DCH", TSG-RAN WG1#35, Lisbon, Portugal, Nov. 17-21, 2003.

Ericsson, "On Channel Reciprocity for Enhanced DL Multi-Antenna Transmission", TSG-RAN WG1 #59, Jeju, Korea, Nov. 9-13, 2009.

Ericsson, "System-level evaluation of OFDM—further considerations", TSG-RAN WG1 #35, Lisbon, Portugal, Nov. 17-21, 2003.

Nortel Networks, "OFDM Exponential Effective SIR Mapping Validation, EESM Simulation Results for System-Level Performance Evaluations, and Text Proposal for Section A.4.5 of TR 25.892", 3GPP TSG-RAN-1/TSG-RAN-4 Ad Hoc, Espoo, Finland, Jan. 27-30, 2004.

Park et al., "Efficient Coherent Neighbour Cell Search for Synchronous 3GPP LTE System", Electronic Letters, vol. 44, No. 21, Oct. 2008.

Motorola, "Low-Overhead Feedback of Spatial Covariance Matrix", TSG-RAN WG1 #59, Jeju, Korea, Nov. 9-13, 2009.

Motorola, "Use of UL Covariance for Downlink MIMO in FDD", TSG-RAN WG1 #59, Jeju, Korea, Nov. 9-13, 2009.

3rd Generation Partnership Project, "Technical Specification Group Radio Access Network; Evolved Universal Terrestrial Radio Access (E-UTRA); Multiplexing and channel coding (Release 8)", 3GPP TS 36.212 V8.6.0 (Mar. 2009), Sophia Antipolis, France.

Samsung, "Discussion on Enhanced DL Beamforming", 3GPP TSG RAN WG1 Meeting #56bis, Seoul, Korea, Mar. 23-27, 2009.

Alcatel-Lucent Shanghai Bell, "Correlation-based Explicit Feedback", 3GPP TSG RAN WG1 Meeting # 59bis, Valencia, Spain, Jan. 18-22, 2010.

International Application PCT/IB2010/051088 Search Report dated Sep. 21, 2010.

International Application PCT/IB2010/053272 Search report dated Dec. 27, 2010.

Motorola, "Codebook for 8Tx DL SU-MIMO for LTE-1", TSG-RAN WG1 #59, Jeju, Korea, Nov. 9-13, 2009.

Marvell Semiconductor, "Precoding Options for 8Tx Antennas in LTE-A DL", 3GPP TSG RAN WG1 Meeting #55bis, Ljubljana, Slovenia, Jan. 12-16, 2009.

Erell, A.,U.S. Appl. No. 13/052,075, filed Mar. 20, 2011.

Marvell, "Codebook Adaptation for ULA Antenna", 3GPP TSG RAN WG1 Meeting #60, San Francisco, USA, Feb. 22-22, 2010.

U.S. Appl. No. 61/321,386, filed Apr. 6, 2010.

U.S. Appl. No. 61/294,737, filed Mar. 13, 2010.

Perets et al., U.S. Appl. No. 12/902,168, filed Oct. 12, 2010.

Mayrench et al., U.S. Appl. No. 12/903,237, filed Oct. 13, 2010.

Alcatel-Lucent, "Fractional Power Control Using Pilot Power Ration Measurements for the E-UTRA Uplink", 3GPP TSG RAN WG1 # 48, St. Louis, USA, Feb. 12-16, 2007.

(56) References Cited

OTHER PUBLICATIONS

Alcatel-Lucent Shanghai Bell, "Considerations on spatial covariance aided implicit feedback for MU-MIMO", 3GPP TSG RAN WG1 Meeting #59, Jeju, Korea, Nov. 9-13, 2009.
Catt, "Feedback enhancements for LTE-A downlink transmission", 3GPP TSG RAN WG1 Meeting #59, Jeju, Korea, Nov. 9-13, 2009.
Marvell, "Details of PUCCH 1-1 for 8Tx", 3GPP TSG RAN # 63, Jacksonville, USA, Nov. 15-19, 2010.
Gomadam et al., U.S. Appl. No. 13/346,737, filed Jan. 10, 2012.
Ericsson et al., "Way Forward for Rel-10 Feedback Framework", 3GPP TSG RAN WG1 Meeting #60, San Francisco, USA, Feb. 22-22, 2010.
Huawei, "Adaptive Feedback: A New Perspective of the Adaptive Codebook", 3GPP TSG RAN WG1 meeting #58, Shenzhen, China, Aug. 24-28, 2009.
Motorola, "Interference Mitigation via Power Control and FSM Resource Allocation and UE Alignment for E-UTRA Uplink and TP", 3GPPP TSG RAN1 # 44, Denver, USA, Feb. 13-17, 2006.
Marvell, "Successive Codebook Refinement: Further details and evaluation", 3GPP TSG-RAN WG1 #60bis, Beijing, Apr. 12-16, 2010.
Marvell Semiconductor, "Feedback Methods for Exploiting Channel Correlation in LTE-A DL", 3GPP TSG RAN WG1 Meeting #57, Los Angeles, USA, Jun. 29-Jul. 3, 2009.
Marvell Semiconductor, "Spatial Correlation based transmission schemes for LTE-A DL", 3GPP TSG RAN WG1 meeting #58, Shenzhen, China, Aug. 24-28, 2009.
Samsung, "Comparisons and performance evaluation of differential feedback proposals for Rel 8 PMI enhancements", 3GPP TSG RAN WG1 Meeting #59bis, Valencia, Spain, Jan. 18-22, 2010.
Samsung, "Codebook Design for 8 Tx Transmission in LTE-A", 3GPP TSG RAN WG1 Meeting #56, Athens, Greece, Feb. 9-13, 2009.
International Application PCT/IB2009/052987 Search Report dated Jan. 27, 2010.
Rapporteur (NTT Docomo), "Text Proposal for RAN1 TR on LTE Advanced", 3GPP TSG RAN WG1 Meeting #53bis, Warsaw, Poland, Jun. 30-Jul. 4, 2008.
Ericsson, "Design and Evaluation of Precoder Codebooks for CSI Feedback", 3GPP TSG RAN WG1 61bis, Dresden, Germany, Jun. 28-Jul. 2, 2010.
Samsung, "Coordinated Multi-Point Operation for LTE", TSG RAN WG1 50, Istanbul, Turkey, Dec. 7-10, 2010.
Alcatel-Lucent et al., "Way Forward on CSI Feedback for Rel.10 DL MIMO", 3GPP TSG RAN WG1 62, Madrid, Spain, Aug. 23-27, 2010.
Alcatel-Lucent et al., "Further Analysis of Companion Feedback Performance and Feedback Signaling Overhead Reduction", 3GPP TSG RAN WG1 62, Madrid, Spain, Aug. 23-27, 2010.
Alcatel-Lucent et al., "Way Forward on CQI/PMI Reporting Enhancement on PUSCH 3-1 for 2, 4 and 8 TX", 3GPP TSG RAN WG1 62bis, Xian, China, Oct. 11-15, 2010.
Marvell, "CQI Enhancement for 4Tx", 3GPP TSG-RAN WG1 #62bis, Xian, Oct. 11-15, 2010.
NEC Group, "Enhancing MU-MIMO CQI," 3GPP TSG-RAN WG1 #62bis, Xian, China, Oct. 11-15, 2010.
LG Electronics, "Further Discussion on CQI/PMI Enhancement", 3GPP TSG RAN # 62BIS, Xian, China, Oct. 11-15, 2010.
Marvell, "Two-Component PMI Codebook for 8TX", 3GPP TSG RAN # 62 Meeting, Madrid, Spain, Aug. 23-27, 2010.
International Application No. PCT/IB2009/052726 Search Report dated Jan. 28, 2010.
International Application No. PCT/IB2010/050014 Search Report dated Jun. 15, 2010.
International Application No. PCT/IB2010/050797 Search Report dated Jul. 15, 2010.
International Application No. PCT/IB2010/051089 Search Report dated Jul. 9, 2010.
Ericsson, "Carrier Aggregation in LTE-Advanced", TSG-RAN WG1 #53bis, Warsaw, Poland, Jun. 30-Jul. 4, 2008.
Viswanath et al., "Opportunistic Beamforming Using Dumb Antennas," IEEE Transactions on Information Theory, vol. 48, No. 6, pp. 1277-1294, Jun. 2002.
Sharif et al., "On the Capacity of MIMO Broadcast Channels with Partial Side Information," IEEE Transactions on Information Theory, vol. 51, No. 2, pp. 506-522, Feb. 2005.
Texas Instruments, "Codebook Design for E-UTRA MIMO Precoding", 3GPP TSG RAN WG1 46bis, Seoul, Korea, Oct. 9-13, 2006.
Samsung, "Codebook based Precoding for 8 Tx Transmission in LTE-A", 3GPP TSG RAN WG1 Meeting #55, Prague, Czech Republic, Nov. 10-14, 2008.
QUALCOMM Europe, "Link Analysis for 4×2 and 4×4 Precoder Set Decision", 3GPP TSG-RAN WG1 #48bis, St. Julian's, Malta, Mar. 26-30, 2007.
3GPP TR 25.892 V6.0.0, "3rd Generation Partnership Project; Technical Specification Group Radio Access Network; Feasibility Study for Orthogonal Frequency Division Multiplexing (OFDM) for UTRAN enhancement (Release 6)", Sophia Antipolis, France, Jun. 2004.
Samsung, "CQI reporting for MU-MIMO", 3GPP TSG RAN WG1 Meeting #54, Jeju, Korea, Aug. 18-22, 2008.
Motorola, "Some Results on DL-MIMO Enhancements for LTE-A", TSG-RAN WG1 #55bis, Ljubljana, Slovenia, Jan. 12-16, 2009.
Alcatel-Lucent, ""Best Companion" reporting for improved single-cell MU-MIMO pairing", 3GPP TSG RAN WG1 #56 Meeting, Athens, Greece, Feb. 9-13, 2009.
Nokia Siemens Networks, "LTE-Advanced SU-MIMO UE Transmission in LTE Release 8 Network", 3GPP TSG RAN WG1 Meeting #57, San Francisco, USA, May 4-8, 2009.
3GPP TS 25.214 V8.5.0, 3rd Generation Partnership Project; Technical Specification Group Radio Access Network; Physical Layer Procedures (FDD) (Release 8), Sophia Antipolis, France, Mar. 2009.
IEEE Standard 802.16 for Local and metropolitan area networks, "Part 16: Air Interface for Fixed Broadband Wireless Access Systems", Revision of IEEE Standard 802.16—2001, IEEE Computer Society and Iee Microwave Theory and Techniques Society, USA, Oct. 1, 2004.
NTT Docomo et al., "Prioritized Deployment Scenarios for LTE-Advanced Studies", 3GPP TSG RAN WG4 Meeting # 50, Athens, Greece, Feb. 9-13, 2009.
Hanzo et al., "OFDM and MCCDMA for Broadband Multi-User Communications, WLANs and Broadcasting", Wiley-IEEE Press, chapter 14, pp. 485-548, Sep. 19, 2003.
China Mobile et al., "Framework for LTE PDSCH DRS Demodulation Requirements", 3GPP TSG RAN WG4 Meeting #49, Prague, Czech Republic, Nov. 10-14, 2008.
QUALCOMM Europe, "Downlink RS Structure in Support of Higher-Order MIMO", 3GPP TSG RAN WG1 Meeting #57, San Francisco, USA, May 4-8, 2009.
"RAN1 Chairman Notes", 3GPP TSG RAN WG1 Meeting #55bis, Ljubljana, Slovenia, Jan. 12-16, 2009.
Marvell Semiconductor, "Number of Codewords for 8×8 SU-MIMO in LTE-A DL", 3GPP TSG RAN WG1 Meeting #55bis, Ljubljana, Slovenia, Jan. 12-16, 2009.
LG Electronics, "Consideration of DL-MIMO in LTE-Advanced", 3GPP TSG RAN WG1 Meeting #55, Prague, Czech Republic, Nov. 10-14, 2008.
3rd Generation Partnership Project; Technical Specification Group Radio Access Network; Further Advancements for E-UTRA Physical Layer Aspects (Release 9), 3GPP TS 36.814 V0.4.1 (Feb. 2009), Sophia Antipolis, France.
ETSI TS 136213, "LTE; Evolved Universal Terrestrial Radio Access (E-UTRA), Physical Layer Procedures", V10.2.0, Jun. 2011.
3rd Generation Partnership Project; Technical Specification Group Radio Access Network; Evolved Universal Terrestrial Radio Access (E-UTRA); Physical Channels and Modulation (Release 8), 3GPP TS 36.211 V8.4.0 (Sep. 2008), Sophia Antipolis, France.
Alcatel-Lucent, "CQI and CSI Feedback Compression", 3GPP TSG RAN WG1 #54bis, Prague, Czech Republic, Sep. 29-Oct. 3, 2008.
Huawei, "DL MIMO Codebook", 3GPP TSG RAN WG1 Meeting #56bis, Seoul, South Korea, Mar. 23-27, 2009.
Huawei, "Adaptive Codebook Designs for MU-MIMO", 3GPP TSG RAN WG1 Meeting #56bis, Seoul, South Korea, Mar. 23-27, 2009.

(56) References Cited

OTHER PUBLICATIONS

Motorola, "On UE Feedback to Support LTE-A MU-MIMO and CoMP Operations", TSG-RAN WG1 #56bis, Seoul, South Korea, Mar. 23-27, 2009.
Huawei, "Adaptive Codebook Designs for DL MIMO", 3GPP TSG RAN WG1 Meeting #57, San Francisco, CA USA, May 3-8, 2009.
Ericsson, "On CSI feedback for ITU Requirement Fulfilling CoMP Schemes", TSG-RAN WG1 #57, San Francisco, USA, May 4-8, 2009.
Motorola, "Spatial Correlation Feedback to Support LTE-A MU-MIMO and CoMP: System Operation and Performance Results", TSG-RAN WG1 #57, San Francisco, USA, May 4-8, 2009.
Xia et al., "Design and Analysis of Transmit—Beamforming based on Limited-Rate Feedback", IEEE Transactions on signal processing (Draft), Minneapolis, MN, Mar. 16, 2005.
Huawei, "The Impact of CA on Mobility in LTE-A", 3GPP TSG RAN WG1 Meeting #56, Athens, Greece, Feb. 9-13, 2009.
U.S. Appl. No. 61/111,475, filed Nov. 5, 2008.
Research in Motion, UK Limited, "Uplink Power Control for Carrier Aggregation", 3GPP TSG RAN WG1 Meeting # 57b, Lon Angeles, USA, Jun. 29-Jul. 3, 2009.
Nokia Siemens Networks, "PUSCH Power Control for LTE-Advanced", 3GPP TSG RAN WG1 Meeting # 57bis, Los Angeles, USA, Jun. 29-Jul. 3, 2009.
3rd Generation Partnership Project; Technical Specification Group Radio Access Network; Radio Frequency (RF) System Scenarios (Release 5), 3GPP TR 25.942 V5.3.0, Sophia Antipolis, France, Jun. 2004.
Nokia Siemens Networks, "Autonomous Component Carrier Selection for LTE Advanced", 3GPP TSG RAN WG1 Meeting #54, Jeju Island, Korea, Aug. 18-22, 2008.
Nokia Siemens Networks, "Algorithms and Results for Autonomous Component Carrier Selection for LTE-Advanced", 3GPP TSG RAN WG1 Meeting #55, Prague, Czech Republic, Nov. 10-14, 2008.
Nokia Siemens Networks, "Use of Background Interference Matrix for Autonomous Component Carrier Selection for LTE-Advanced", 3GPP TSG RAN WG1 Meeting #55-bis, Ljubljana, Slovenia, Jan. 12-16, 2009.
QUALCOMM Europe, Notion of Anchor Carrier in LTE-A, 3GPP TSG RAN WG1 Meeting #55-bis, Ljubljana, Slovenia, Jan. 12-16, 2009.
Samsung, "UL Transmission Power Control in LTE-A", 3GPP TSG RAN WG1 Meeting #56bis, Seoul, Korea, Mar. 23-27, 2009.
International Application PCT/IB2010/055763 Search Report dated Jun. 14, 2011.
International Application PCT/IB2011/050015 Search Report dated Jul. 5, 2011.
Marvell, "Downlink MIMO with Coordinated Beamforming and Scheduling", 3GPP TSG RAN WG1 59, Jeju, South Korea, Nov. 9-14, 2009.
Texas Instruments, "Views and Simulation Results on 4Tx Codebook Enhancement", 3GPP TSG RAN WG1 62, Madrid, Spain, Aug. 23-27, 2010.
Texas Instruments, "Higher CSI feedback accuracy for 4/8Tx Re1.10 DL MIMO", 3GPP TSG RAN WG1 62, Madrid, Spain, Aug. 23-27, 2010.
U.S. Appl. No. 13/672,727 Office Action dated Sep. 19, 2014.
European Application # 12765629 Search Report dated Aug. 5, 2014.
U.S. Appl. No. 13/610,904 Office Action dated Oct. 7, 2014.
U.S. Appl. No. 13/669,476 Office Action dated Mar. 31, 2014.
U.S. Appl. No. 14/179,593 Office Action dated Apr. 9, 2014.
U.S. Appl. No. 12/903,237 Office Action dated Feb. 27, 2014.
JP Application # 2012537460 Office Action dated Jan. 21, 2014.
NTT Docomo, 3GPP TSG RAN WG1, "Views on Scalable CSI Feedback for DL CoMP in LTE-Advanced", Meeting #58bis, R1-094243, pp. 1-5, Oct. 12-16, 2009.
NTT Docomo, 3GPP TSG RAN WG1, "Views on Single-Cell CSI Feedback Enhancement for DL MU-MIMO in LTE-Advanced", Meeting #58bis, R1-094241, pp. 1-6, Oct. 12-16, 2009.
U.S. Appl. No. 13/669,477 Office Action dated Apr. 14, 2014.
U.S. Appl. No. 12/477,152 Official Action dated Jun. 26, 2012.
U.S. Appl. No. 12/723,645 Official Action dated Aug. 31, 2012.
U.S. Appl. No. 12/723,647 Official Action dated Aug. 17, 2012.
U.S. Appl. No. 12/652,044 Official Action dated Jun. 29, 2012.
U.S. Appl. No. 12/838,509 Official Action dated Jun. 21, 2012.
U.S. Appl. No. 13/023,555 Official Action dated Sep. 14, 2012.
International Application PCT/IB2012/051511 Search Report dated Aug. 31, 2012.
Gomadam et al., U.S. Appl. No. 13/610,904, filed Sep. 12, 2012.
3GPP TR 36.819 "3rd Generation Partnership Project; Technical Specification Group Radio Access Network; Coordinated Multi-Point Operation for LTE Physical Layer Aspects (release 11)", version 11.0.0, Sep. 2011.
JP Patent Application # 2011-544111 Official Action dated Nov. 6, 2012.
U.S. Appl. No. 13/253,078 Office Action dated May 23, 2013.
Asahi, H., "A Function Generator for Walsh Order Hadamard Matrix and Fast Walsh-Hadamard Transform", Geoinformatics, vol. 11, No. 1, pp. 3-9, year 2000.
Alcatel-Lucent et al., "Way Forward on Enhancement for Rel.10 DL MIMO", 3GPP TSG RAN WG1 62, Madrid, Spain, Aug. 23-27, 2010.
Samsung, "Preliminary CoMP JP Results for Homogeneous Networks", 3GPP TSG RAN # 64, Taipei, Taiwan, Feb. 21-25, 2011.
Huawei, "Performance Evaluation of Phase 1: Downlink Homogeneous Network with High Tx Power RRHs", 3GPP TSG RAN # 64, Taipei, Taiwan, Feb. 21-25, 2011.
ZTE, "Initial CoMP Evaluation for Homogeneous Network with High Tx Power RRHs", 3GPP TSG RAN # 64, Taipei, Taiwan, Feb. 21-25, 2011.
U.S. Appl. No. 12/723,647 Official Action dated Feb. 6, 2012.
U.S. Appl. No. 12/723,647 Official Action dated Apr. 27, 2012.
Zhang et al., U.S. Appl. No. 13/409,130, filed Mar. 1, 2012.
U.S. Appl. No. 12/652,044 Official Action dated Feb. 7, 2012.
Alcatel-Lucent et al., "Way Forward on 8Tx Codebook for Re1.10 DL MIMO", 3GPP TSG RAN WG1 62, Madrid, Spain, Aug. 23-27, 2010.
Huang et al., "A Limited Feedback Precoding System with Hierarchical Codebook and Linear Receiver", IEEE Transactions on Wireless Communications, vol. 7, No. 12, pp. 4843-4848, Dec. 2008.
Kim et al., "Efficient Feedback via Subs pace-Based Channel Quantization for Distributed Cooperative Antenna Systems with Temporarily Correlated Channels", EURASIP Journal on Advances in Signal Processing, vol. 2008, Nov. 23, 2007.
NTT Docomo, "Views on Codebook Design for Downlink 8Tx MIMO", 3GPP TSG RAN WG1 Meeting #59bis, Valencia, Spain, Jan. 18-22, 2010.
Alcatel Lucent, "Overview of Hierarchical Codebook Approach", 3GPP TSG RAN WG1 Meeting #59bis, Valencia, Spain, Jan. 18-22, 2009.
JP Patent Application # 2011-024295 Official Action dated Sep. 11, 2012.
Samsung, "Precoding for polarized 4Tx configurations", 3GPP TSG RAN WG1 Meeting #48bis, St Julian's, Malta, Mar. 26-30, 2007.
Mondal et al., "Rank-Independent Codebook Design from a Quaternary Alphabet", Proceedings of 41st Asilomar Conference on Signals, Systems and Computers (ACSSC), pp. 297-301, Nov. 7, 2007.
ZTE, "Link Analysis of 4Tx Codebook Design for DL SU-MIMO", 3GPP TSG-RAN WG1 #48bis, St. Julians, Malta, Mar. 26-30, 2007.
3GPP TS 36.213, "3rd Generation Partnership Project; Technical Specification Group Radio Access Network; Evolved Universal Terrestrial Radio Access (E-UTRA); Physical layer procedures (Release 10)", version 10.3.0., Sep. 2011.
U.S. Appl. No. 12/965,878 Official Action dated Apr. 1, 2013.
U.S. Appl. No. 13/023,555 Office Action dated Feb. 5, 2013.
International Application PCT/IB2012/056181 Search Report dated Mar. 4, 2013.
International Application PCT/IB2012/056289 Search Report dated Mar. 26, 2013.
International Application PCT/IB2012/056182 Search Report dated Feb. 26, 2013.
Japanese Patent Application # 2011024295 Office Action dated Jan. 15, 2013.

(56) References Cited

OTHER PUBLICATIONS

Gomadam, K.S., U.S. Appl. No. 13/888,385, filed May 7, 2013.
Gomadam et al., U.S. Appl. No. 13/736,959, filed Jan. 1, 2013.
U.S. Appl. No. 13/252,218 Office Action dated Apr. 11, 2013.
Japanese Patent Application # 2011-544111 Office Action dated Mar. 12, 2013.
U.S. Appl. No. 12/902,168 Office Action dated Aug. 5, 2013.
U.S. Appl. No. 12/983,898 Office Action dated Sep. 12, 2013.
U.S. Appl. No. 13/052,075 Office Action dated Jul. 15, 2013.
U.S. Appl. No. 13/766,790 Office Action dated Jul. 22, 2013.
U.S. Appl. No. 12/903,237 Office Action dated Aug. 16, 2013.
International Application PCT/IB2013/052963 Search Report dated Sep. 27, 2013.
JP Patent Application # 2011-551560 Office Action dated Oct. 29, 2013.
JP Patent Application # 2012-506601 Office Action dated Oct. 22, 2013.
U.S. Appl. No. 12/965,878 Office Action dated Oct. 24, 2013.
U.S. Appl. No. 13/052,075 Notice of Allowance dated Nov. 8, 2013.
U.S. Appl. No. 12/965,878 Notice of Allowance dated Feb. 10, 2014.
U.S. Appl. No. 13/610,904 Office Action dated May 1, 2014.
U.S. Appl. No. 13/433,293 Office Action dated Jun. 24, 2014.
U.S. Appl. No. 13/346,737 Office Action dated Dec. 24, 2014.
U.S. Appl. No. 13/610,904 Office Action dated Mar. 4, 2015.

* cited by examiner

METHOD AND SYSTEM FOR COORDINATED MULTIPOINT (COMP) COMMUNICATION BETWEEN BASE-STATIONS AND MOBILE COMMUNICATION TERMINALS

CROSS-REFERENCE TO RELATED APPLICATIONS

This application claims the benefit of U.S. Provisional Patent Application 61/639,779, filed Apr. 27, 2012, which is incorporated herein by reference.

FIELD OF THE DISCLOSURE

The present disclosure relates generally to wireless communication, and particularly to methods and systems for coordinated transmission.

BACKGROUND

In some Multiple-Input Multiple-Output (MIMO) communication systems, multiple cells use Cooperative Multipoint (CoMP) transmission schemes for coordinating downlink MIMO transmissions to User Equipment (UEs). Third Generation Partnership Project (3GPP) Long Term Evolution-Advanced (LTE-A) systems, for example, use or contemplate the use of multiple CoMP modes such as Dynamic Point Selection (DPS), Dynamic Point Blanking (DPB), Cooperative beamforming (CB) and Joint Processing (JP). CoMP operation in LTE-A are specified, for example, in "3rd Generation Partnership Project; Technical Specification Group Radio Access Network; Coordinated multi-point operation for LTE physical layer aspects (Release 11)," 3GPP TR 36.819, September, 2011, which is incorporated herein by reference.

SUMMARY

An embodiment provides a method including receiving, at a communication terminal, signals from a group of cells that cooperate in a Coordinated Multipoint (CoMP) transmission scheme. Signaling that specifies a CoMP resource management (CRM) set is received at the communication terminal. The CRM set includes a subset of the cells in the group for which the communication terminal is to perform signal measurements. A size of the CRM set is restricted to a predefined maximum size. The signal measurements are performed at the communication terminal only on the signals received from one or more of the cells in the CRM set. The signal measurements performed on the one or more of the cells in the CRM set are reported from the communication terminal.

In some embodiments, the predefined maximum size of the CRM set is five. In an embodiment, receiving the signals includes receiving a same cell identifier from all the cells in the group, and performing the signal measurements includes measuring multiple different Channel State Information Reference Signals (CSI-RS) resources assigned to one or more of the cells in the CRM set. In an example embodiment, receiving the signals includes receiving each CSI-RS resource from at least two antenna ports of the group of cells.

In a disclosed embodiment, reporting the signal measurements includes differentially encoding multiple signal measurements, and reporting the differentially-encoded signal measurements.

In another embodiment, the method further includes, in response to the reported signal measurements, receiving at the communication terminal an indication that specifies a Channel State Information (CSI) measurement set including one or more of the cells in the CRM set for which the communication terminal is to report CSI, wherein a size of the CSI measurement set is restricted to a predefined maximum size, and measuring and reporting the CSI for at least one of the cells in the CSI measurement set. In an example embodiment, the predefined maximum size of the CSI measurement set is three.

In a disclosed embodiment, receiving the indication includes receiving a selection of the CSI reporting set, wherein the selection of the CSI reporting set includes (i) a cell having a strongest reported signal measurement among the cells in the CRM set, and (ii) one or more additional cells in the CRM set whose reported signal measurement is lower than the strongest reported signal measurement by no more than a predefined offset.

In another embodiment, performing and reporting the signal measurements include performing and reporting the signal measurements for only a partial subset of the CRM set. In yet another embodiment, reporting the signal measurements includes, for each of the one or more of the cells in the CRM set, reporting both a respective Reference Signal Received Power (RSRP) and a respective Reference Signal Received Quality (RSRQ).

There is additionally provided, in accordance with an embodiment, an apparatus including a receiver, processing circuitry and a transmitter. The receiver is configured to receive signals from a group of cells that cooperate in a Coordinated Multipoint (CoMP) transmission scheme, and to receive signaling that specifies a CoMP resource management (CRM) set. The CRM set includes a subset of the cells in the group for which the communication terminal is to perform signal measurements, and a size of the CRM set is restricted to a predefined maximum size. The processing circuitry is configured to perform the signal measurements only on the signals received from one or more of the cells in the CRM set and to produce a report indicative of the signal measurements performed on the one or more of the cells in the CRM set. The transmitter is configured to transmit the report.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings.

BRIEF DESCRIPTION OF THE DRAWINGS

Like reference symbols in the various drawings indicate like elements.

DETAILED DESCRIPTION

Figure 1:
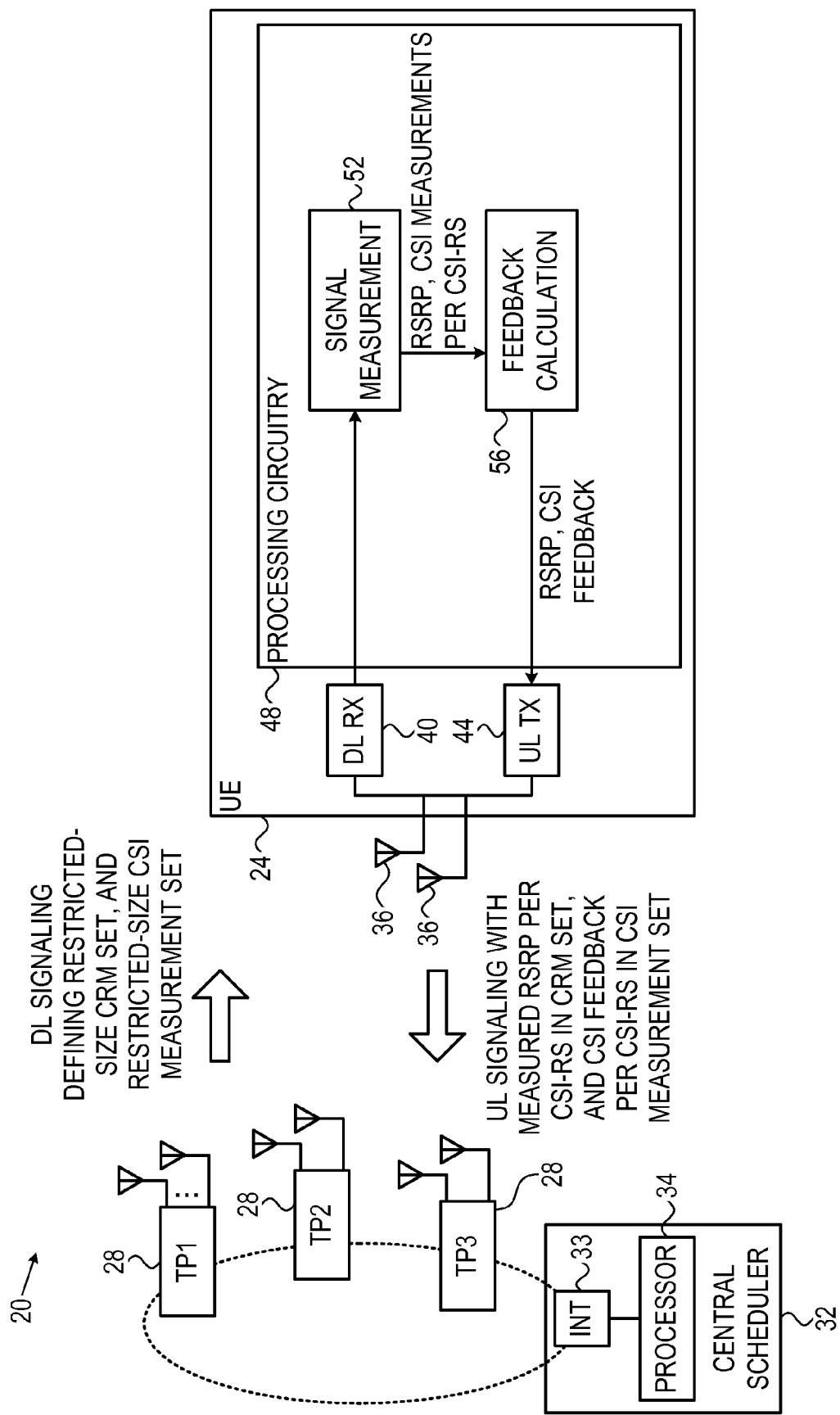
FIG. 1 is a block diagram that schematically illustrates a Cooperative Multipoint (CoMP) communication system, in accordance with an embodiment.

Embodiments that are described herein provide methods and systems for Coordinated Multipoint (CoMP) communication between base-stations (e.g., eNode-B or eNB in 3GPP LTE) and mobile communication terminals (also referred to herein generally as "terminals") (e.g., UE in 3GPP LTE). The base stations are also referred to as cells or Transmission Points (TPs). Typically, multiple TPs are controlled by a central scheduler so as to transmit CoMP transmissions to one or more mobile communication terminals.

The central scheduler configures the CoMP transmissions based on Channel State Information (CSI) feedback that is measured and reported by the terminals. CSI may comprise various suitable channel measures such as, for example, Channel Quality Indicator (CQI), Precoding Matrix Indicator (PMI) and/or Rank Indicator (RI) values.

In some CoMP configurations, the various cooperating TPs use the same cell ID. In order to enable the terminals to distinguish between different TPs for CSI measurement, in some embodiments the central scheduler assigns different CSI Reference Signals (CSI-RS) to different respective TPs (and possibly to groups of TPs). Each such TP or group of TPs is referred to as a CSI-RS resource, and the terminals perform CSI measurements per CSI-RS resource. The TPs are therefore also sometimes referred to herein as CSI-RS resources.

Typically, for a given terminal, the central scheduler selects a group of CSI-RS resources for which the terminal is instructed to measure CSI. This group is referred to as a CSI measurement set. The CSI measurement set is selected in a two-stage process: In the first stage, the scheduler selects a group of CSI-RS resources for which the terminal is instructed to perform signal measurements. This group is referred to as a CoMP Resource Management (CRM) set. The terminal performs the signal measurements (e.g., Reference Signal Received Power—RSRP, or Reference Signal Received Quality—RSRQ) and reports the signal measurements to the central scheduler. In the second stage, the central scheduler selects the CSI measurement set from within the CRM set based on the reported signal measurements.

In some disclosed embodiments, the central scheduler restricts the size of the CRM set to a predefined maximum size, and also restricts the size of the CSI measurement set to a predefined maximum size. The maximum sizes are typically chosen so as to balance feedback quality and signaling overhead. In an example embodiment, the size of the CRM set is restricted to no more than five CSI-RS resources, and the size of the CSI measurement set is restricted to no more than three CSI-RS resources.

In various embodiments, the central scheduler and the terminal use different techniques for selecting the CSI measurement set under the above constraints. In an example embodiment, the central scheduler includes in the CSI measurement set the CSI-RS resource having the best signal measurement in the CRM set, plus up to two additional CSI-RS resources whose signal measurements differ from the best signal measurement by no more than a predefined margin.

In another embodiment, the terminal is allowed to perform and report signal measurement for only a selected subset of the CRM set, so as to further reduce signaling overhead. This feature causes little or no degradation in feedback quality, since the terminal is typically able to identify and report the subset of CSI-RS resource having the best signal measurements. Other techniques, such as signal measurement calculation over CSI-RS resources of multiple antenna ports, measurement of both RSRP and RSRQ, and differential encoding of signal measurement feedback, are also described herein. The disclosed techniques increase feedback accuracy and reduce signaling overhead, and therefore improve the overall performance of the CoMP system.

FIG. 1 is a block diagram that schematically illustrates a Cooperative Multipoint (CoMP) communication system 20 that uses Multiple-Input Multiple-Output (MIMO) transmission, in accordance with an embodiment. In the present example, system 20 operates in accordance with Third Generation Partnership Project (3GPP) Long Term Evolution-Advanced (LTE-A) specifications. In alternative embodiments, system 20 may operate in accordance with any other suitable communication protocol in which cells coordinate transmission with one another, such as, for example, WiMAX or Wi-Fi.

In the embodiment of FIG. 1, system 20 comprises a mobile communication terminal 24 (referred to in LTE-A terminology as User Equipment—UE) and three cells 28 (base stations or transmission points) denoted CELL1, CELL2 and CELL3. The terms cell, base station and Transmission Point (TP) are used interchangeably herein. The choice of presenting a single UE and three cells is made purely by way of example. In real-life configurations, system 20 typically comprises a large number of cells, some of which may be collocated, and a large number of terminals. Each UE 24 comprises, for example, a cellular phone, a wireless-enabled computing device or any other suitable type of communication terminal.

Cells 28 cooperate with one another in transmitting precoded (i.e., beamformed) signals to UEs 24. A group of cells that cooperate in this manner, such as CELL1, CELL2 and CELL3, is referred to as a cooperating set. In various embodiments, cells 28 may use CoMP modes such as DPS, DPB, JP, CB, and possibly alternate between different modes over time.

In the present embodiment, system 20 comprises a central scheduler 32, which schedules the transmissions of the various cells to the various UEs, and calculates precoding vectors (i.e., sets of complex weights to be applied to the signals transmitted via the respective transmit antennas of the cells) to be applied by the cells when transmitting the CoMP transmissions. In some embodiments the central scheduler 32 also selects the appropriate CoMP mode.

In the embodiments disclosed herein, central scheduler 32 selects, for each UE, sets of cells that are referred to as a CoMP Resource Management (CRM) set and a Channel State Information (CSI) measurement set. These functions are explained in detail below. Central scheduler 32 typically selects the various sets of cells, and/or the precoding vectors, based on channel feedback that is received from the UEs.

In some embodiments, central scheduler 32 comprises an interface 33 for communicating with cells 28, and a processor 34 that carries out the functions described herein. In alternative embodiments, some or all of the functions of central scheduler 32 are carried out by a processor in one of the cells, or by any other suitable processor. The description that follows refers to the central scheduler as performing the disclosed techniques, for the sake of clarity. In alternative embodiments, however, the disclosed techniques can be carried out using any suitable processor or multiple processors.

In the embodiment of FIG. 1, UE 24 comprises one or more antennas 36, a downlink receiver (DL RX) 40, an uplink transmitter (UL TX) 44, and processing circuitry 48. Receiver 40 receives downlink signals from cells 28 via antennas 36. Processing circuitry 48 processes the signals received by receiver 40. In the present embodiment, processing circuitry 48 comprises a channel signal measurement unit 52, which performs various signal measurements on the received downlink signals.

The signal measurements may comprise, for example, Reference Signal Received Power (RSRP) measurements and CSI measurements. In some embodiment, individual transmission points (and possibly groups of transmission points) are defined as CSI Reference Signal resources (CSI-RS resources) and are configured to transmit unique reference signals that are referred to as CSI-RS. Unit 52 performs RSRP and CSI measurements per CSI-RS resource. RSRP measurement typically involves measuring the received power level of one or more of the corresponding CSI-RS. CSI measurement typically involves estimating the channel response for one or more of the corresponding CSI-RS. Typically although not necessarily, cells 28 use the same cell identifier (Cell ID) but different CSI-RS resources.

A feedback calculation module 56 calculates channel feedback, e.g., RSRP and CSI feedback, based on the measurements carried out by module 52. The channel feedback is provided to UL TX 44 for transmission to scheduler 32 via cells 28.

The configurations of the UE 24 and central scheduler 32 shown in FIG. 1 are example configurations, which are depicted in a highly simplified manner solely for the sake of clarity. In alternative embodiments, any other suitable configuration for the UE 24 or central scheduler 32 can be used. Elements of the UE 24 and central scheduler 32 that are not mandatory for understanding of the disclosed techniques have been omitted from the figure for the sake of clarity.

In various embodiments, some or all of the elements of UE 24 and central scheduler 32, including receiver 40, transmitter 44, processing circuitry 48, interface 33 and processor 34, are implemented in hardware, such as implementing receiver 40 and/or transmitter 44 using one or more Radio Frequency Integrated Circuits (RFICs), or implementing processing circuitry 48 or processor 34 using one or more Field-Programmable Gate Arrays (FPGAs) or Application-Specific Integrated Circuits (ASICs). In alternative embodiments, certain elements of UE 24 and/or central scheduler 32 are implemented in software, or using a combination of hardware and software elements.

In some embodiments, certain elements of the UE 24 and/or central scheduler 32, such as certain elements of processing circuitry 48 and/or processor 34, are implemented in one or more programmable processors, which are programmed in software to carry out the functions described herein. The software may be downloaded to the processors, in whole or in part, in electronic form, over a network, for example, or the software may, alternatively or additionally, be provided and/or stored on non-transitory tangible media, such as magnetic, optical, or electronic memory.

Figure 2:
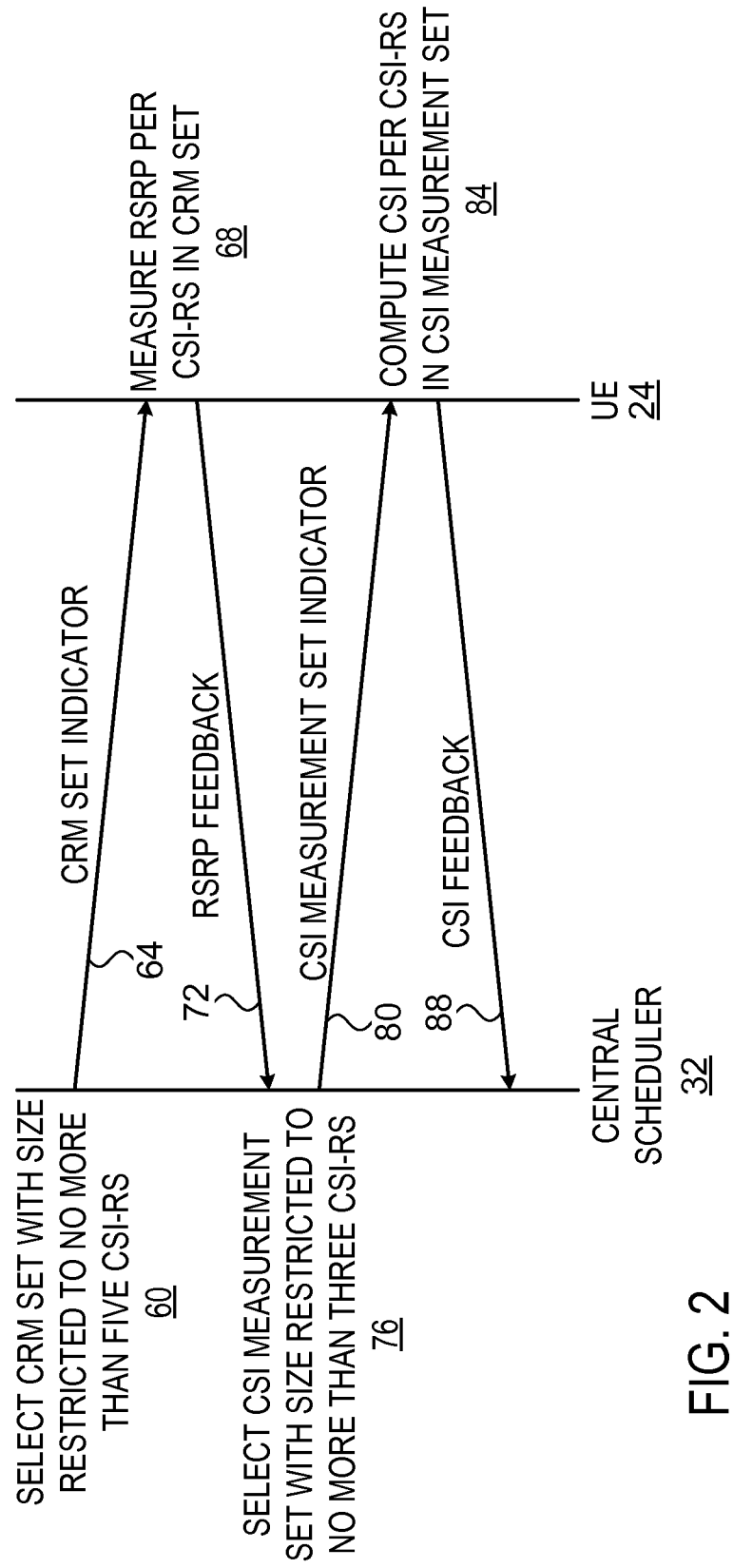
FIG. 2 is a diagram that schematically illustrates signaling in a CoMP communication system, in accordance with an embodiment.

FIG. 2 is a diagram that schematically illustrates signaling in CoMP communication system 20, in accordance with an embodiment. This diagram demonstrates a process of selecting the CRM set and the CSI measurement set for a given UE (e.g., UE 24). The two sets are typically defined in terms of CSI-RS resources. A CSI-RS resource often corresponds to a single respective cell or TP. Nevertheless, system 20 may have the option of grouping two or more cells to form a single CSI-RS resource, i.e., to simultaneously transmit the same CSI-RS from two or more cells. As noted above, cells corresponding to different CSI-RS resources may share the same cell ID.

For a given UE, the CRM set is defined as the group of CSI-RS resources for which the UE is requested to perform signal measurements. The signal measurement may comprise, for example, RSRP or Reference Signal Received Quality—RSRQ. RSRP is typically indicative of the absolute received power level of the CSI-RS, whereas the RSRQ is typically indicative of the ratio between the received power level of the CSI-RS and the noise and interference. The CSI measurement set is defined as the group of CSI-RS resources for which the UE is requested to measure CSI. As can be seen in the figure, the process has two stages—A first stage for selecting the CRM set and a second stage for selecting the CSI measurement set from among the cells in the CRM set.

The process begins with central scheduler 32 selecting the CRM set, at a CRM set selection step 60. In some embodiments, the size of the CRM set (i.e., the number of CSI-RS resources in the set) is restricted to some predefined maximum size. In an embodiment, the predefined maximum size of the CRM set is five. This maximum size is suitable for most practical system configurations, including large macro-cells having many pico-cells. (When using a smaller CRM set, the best CSI-RS resource may fall outside the CRM set.) At the same time, this maximum size incurs reasonable signaling overhead (e.g., CSI-RS transmission in the downlink and RSRP feedback transmission in the uplink). Nevertheless, a maximum CRM set size of five is given by way of example, and other suitable values can also be used in alternative embodiments.

Central scheduler 32 may select the cells in the CRM set in various ways, such as based on Sounding Reference Signals (SRS), mobility measurements or any other suitable information and criteria. Central scheduler 32 sends a CRM set indicator to UE 24, at a CRM set signaling step 64. The CRM set indicator indicates the CSI-RS resources in the CRM set to the UE 24.

The UE 24 performs the signal measurements on one or more of the CSI-RS resources in the CRM set, at a signal measurement step 68. In an embodiment, unit 52 in the UE 24 measures the RSRP for each of the CSI-RS resources in the CRM set. In other embodiments, unit 52 may measure RSRQ per each CSI-RS resource, either instead of or in addition to RSRP.

In some embodiments, the UE 24 performs signal measurements for only a partial subset of the CSI-RS resources in the CRM set. In an example embodiment, the UE decides to report signal measurements only for the CSI-RS resource that was received with the highest signal level, plus one or two additional CSI-RS resources that are received with the next-strongest signal level. In an embodiment, the UE 24 may report the signal measurements for the strongest CSI-RS resource and for up to two additional CSI-RS resources that are within a certain power offset from the highest signal level. In an example embodiment, the power offset is 3 dB. The power offset may be configured and modified by the system.

UE 24 transmits RSRP feedback to central scheduler 32, at an RSRP feedback step 72. The RSRP feedback is indicative of the RSRP values measured for the respective CSI-RS resources in the CRM set.

Based on the RSRP feedback, central scheduler 32 selects the CSI-RS resources to be included in the CSI measurement set for UE 24, at a CSI measurement set selection 76. In some embodiments, the size of the CSI measurement set (i.e., the number of CSI-RS resources in the set) is restricted to some predefined maximum size. In an embodiment, the predefined maximum size of the CSI measurement set is two or three. Alternatively, any other suitable maximum size for the CSI measurement set can be used.

Central scheduler 32 sends a CSI measurement set indicator to UE 24, at a CSI measurement set signaling step 80. The CSI measurement set indicator indicates the CSI-RS resources in the CSI measurement set to the UE 24. The UE 24 computes the CSI for one or more of the CSI-RS resources in the CSI measurement set, at a CSI computation step 84. In some embodiments, the UE 24 performs CSI computation for only a partial subset of the CSI-RS resources in the CSI measurement set.

UE 24 transmits CSI feedback to central scheduler 32, at a CSI feedback step 88. The CSI feedback is indicative of the CSI values measured for the respective CSI-RS resources in the CSI measurement set.

In some embodiments, at step 72, processing circuitry 48 in UE 24 chooses to report RSRP/RSRQ feedback for only a partial subset of the CSI-RS resources in the CRM set. This feature allows the UE additional freedom in trading signaling overhead and performance. In an example embodiment, N=8 CSI-RS resources are configured for RSRP/RSRQ measurement, but the UE 24 chooses to report RSRP/RSRQ feedback for only the best-performing M=3 CSI-RS resources. In an embodiment, for each of the M CSI-RS resources in the partial subset, the RSRP/RSRP feedback comprises an index of the CSI-RS resource in the CRM set, and the corresponding RSRP/RSRQ.

In some embodiments, cells 28 transmit the downlink signals in time frames that are divided into multiple time-frequency Resource Elements (REs). For each transmit antenna port in a given CSI-RS resource, the CSI-RS are transmitted in a respective periodic pattern of time-frequency REs. Typically, the CSI-RS are distributed sparsely in time and frequency, and the UE should typically perform measurements over a large time-frequency range in order to achieve reliable power or channel estimation.

Therefore, in some embodiments, central scheduler 32 configures the transmission of each CSI-RS over at least two transmit antenna ports. Moreover, in some embodiments the UE 24 measures the RSRP/RSRQ over the entire bandwidth allocated to the CSI-RS resource.

In some embodiments, in selecting the CSI measurement set from among the CRM set, central scheduler 32 considers the interference seen by the UEs. This feature is important, for example, since some TPs close to the UE may be on the border of the coordination area. In such scenarios, a certain TP may be received with high RSRP (strong CSI-RS power) but poor RSRP (strong interference). Associating the UE with such a TP is typically not beneficial, and other TPs (which may have weaker RSRP but better RSRQ) may be better.

Thus, in some embodiments, the UE 24 reports RSRQ in addition to RSRP for the CSI-RS resources in the CRM set. Based on this report, central scheduler 32 is able to better select the CSI measurement set. This feature also reduces signaling overhead, since the RSRQ is reported only for the CRM set and not for all CSI-RS resources.

In some embodiments, the unit 56 in UE 24 formats the RSRP feedback using differential encoding. In these embodiments, the UE 24 typically reports the full RSRP for one CSI-RS resource in the CRM set as a baseline value. In addition, the UE 24 reports the differences or offsets of the other RSRP values from this baseline value. Typically although not necessarily, the baseline value comprises the strongest RSRP in the CRM set.

It is noted that the embodiments described above are cited by way of example, and that various embodiments are not limited to what has been particularly shown and described hereinabove. Rather, the scope of the present disclosure includes both combinations and sub-combinations of the various features described hereinabove, as well as variations and modifications. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
receiving, at a communication terminal, signals from a group of cells that cooperate in a Coordinated Multipoint (COMP) transmission scheme; and
performing in the communication terminal a two-stage process of reporting Channel State Information (CSI) for one or more of the cells in the group, by:
in a first stage, receiving first signaling that specifies a first subset of the cells in the group for which the communication terminal is to perform signal measurements, wherein a size of the first subset is restricted to a first maximum size, performing the signal measurements on the signals received from one or more of the cells in the first subset, and reporting the signal measurements; and
in a second stage, receiving second signaling that specifies a second subset of the cells in the group for which the communication terminal is to report the CSI, wherein the cells in the second subset have been selected from among the cells in the first subset based on the signal measurements reported in the first stage, and wherein the size of the second subset is restricted to a second maximum size, and measuring and reporting the CSI for at least one of the cells in the second subset.

2. The method according to claim 1, wherein the first maximum size is five.

3. The method according to claim 1, wherein:
receiving the signals comprises receiving a same cell identifier from all the cells in the group; and
performing the signal measurements comprises measuring multiple different Channel State Information Reference Signals (CSI-RS) resources assigned to one or more of the cells in the first subset.

4. The method according to claim 3, wherein receiving the signals comprises receiving each CSI-RS resource from at least two antenna ports of the group of cells.

5. The method according to claim 1, wherein reporting the signal measurements comprises differentially encoding multiple signal measurements, and reporting the differentially-encoded signal measurements.

6. The method according to claim 1, wherein the second maximum size is three.

7. The method according to claim 1, wherein receiving the second signaling comprises receiving a selection of the second subset, and wherein the selection of the second subset comprises (i) a cell having a strongest reported signal measurement among the cells in the first subset, and (ii) one or more additional cells in the first subset whose reported signal measurement is lower than the strongest reported signal measurement by no more than a predefined offset.

8. The method according to claim 1, wherein performing and reporting the signal measurements comprise performing and reporting the signal measurements for only a partial subset of the first subset.

9. The method according to claim 1, wherein reporting the signal measurements comprises, for each of the one or more of the cells in the first subset, reporting both a respective Reference Signal Received Power (RSRP) and a respective Reference Signal Received Quality (RSRQ).

10. An apparatus, comprising:
a receiver configured to receive signals from a group of cells that cooperate in a Coordinated Multipoint (COMP) transmission scheme; and
processing circuitry, which is configured to perform a two-stage process of reporting Channel State Information (CSI) for one or more of the cells in the group, by:
in a first stage, receiving first signaling that specifies a first subset of the cells in the group for which the processing circuitry is to perform signal measurement, wherein a size of the first subset is restricted to a first maximum size, performing the signal measurements only on the signals received from one or more of the cells in the first subset, and reporting the signal measurements performed on the one or more of the cells in the first subset; and in a second stage, receiving second signaling that specifies a second subset of the cells in the group for which the processing circuitry is to report the CSI, wherein the cells in the second subset have been selected from among the cells in the first subset based on the signal measurements reported in the first stage, and wherein the size of the second subset is restricted to a second maximum size, and measuring and reporting the CSI for at least one of the cells in the second subset.

11. The apparatus according to claim 10, wherein the first maximum size is five.

12. The apparatus according to claim 10, wherein:

the receiver is configured to receive the signals with a same cell identifier from all the cells in the group; and the processing circuitry is configured to perform the signal measurements for multiple different Channel State Information Reference Signals (CSI-RS) resources assigned to one or more of the cells in the first subset.

13. The apparatus according to claim 10, wherein the processing circuitry is configured to report the signal measurements by differentially encoding multiple signal measurements.

14. The apparatus according to claim 10, wherein the second maximum size is three.

15. The apparatus according to claim 10, wherein the processing circuitry is configured to receive a selection of the second subset, wherein the selection of the second subset comprises (i) a cell having a strongest reported signal measurement among the cells in the first subset, and (ii) one or more additional cells in the first subset whose reported signal measurement is lower than the strongest reported signal measurements by no more than a predefined offset.

16. The apparatus according to claim 10, wherein the processing circuitry is configured to perform and report the signal measurements for only a partial subset of the first subset.

17. The apparatus according to claim 10, wherein the receiver and the processing circuitry are comprised in a mobile communication terminal.

18. The apparatus according to claim 10, wherein the receiver and the processing circuitry are comprised in a chipset for processing signals in a mobile communication terminal.

* * * * *